Dec. 10, 1935. J. R. POPPEN 2,023,488
APPARATUS FOR DETERMINING THE RATE OF MUSCULAR
AND MENTAL COORDINATION OF PERSONNEL
Filed Dec. 24, 1931 5 Sheets-Sheet 1
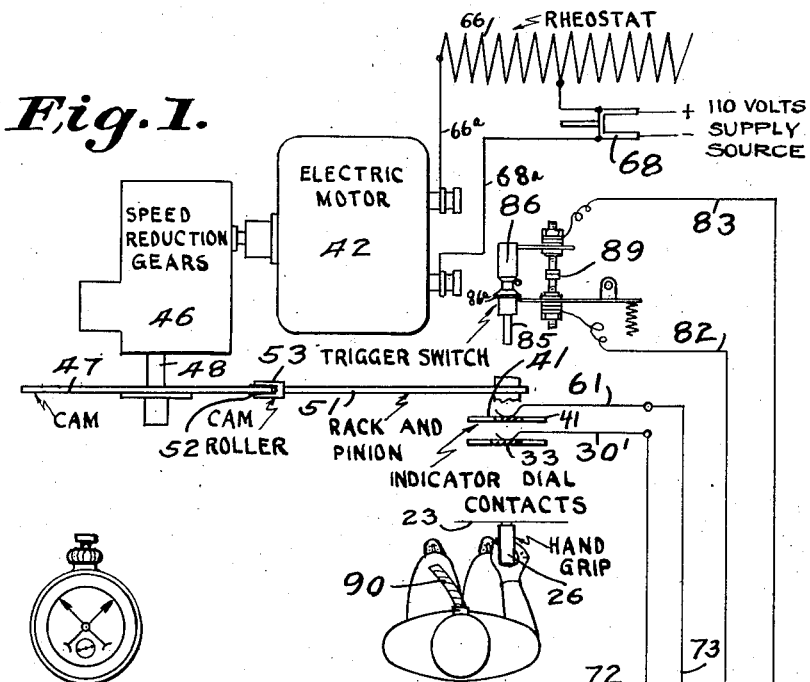
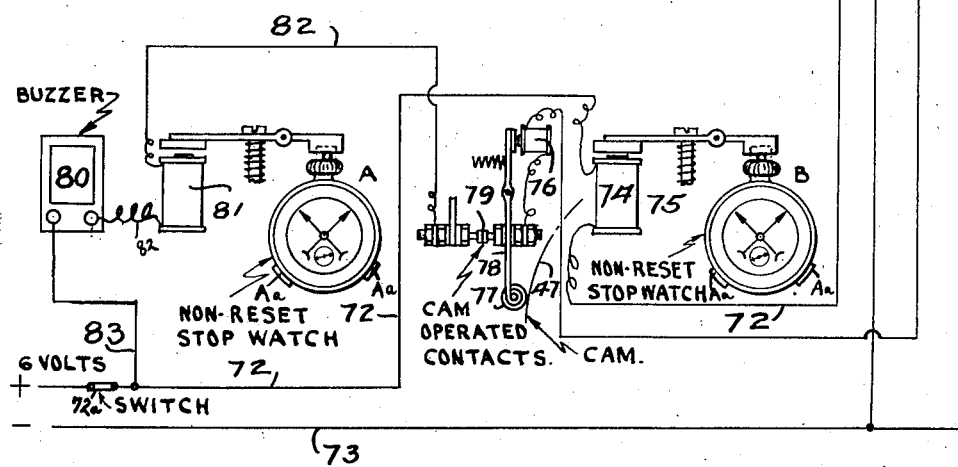
INVENTOR
JOHN R. POPPEN
BY ATTORNEY

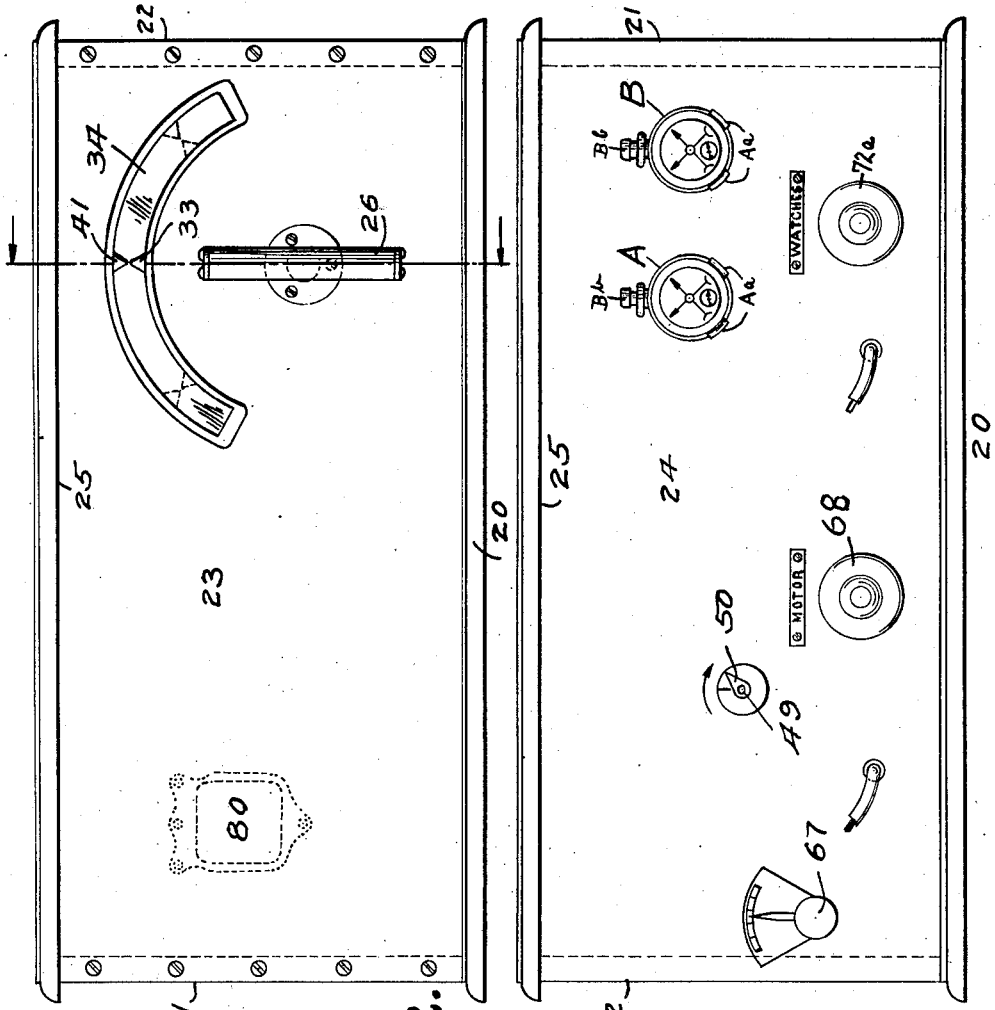
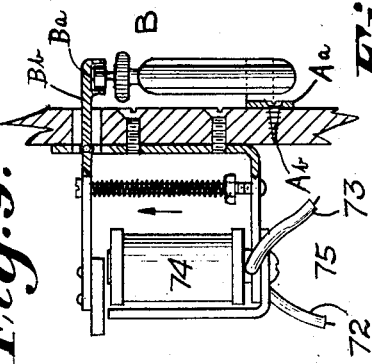

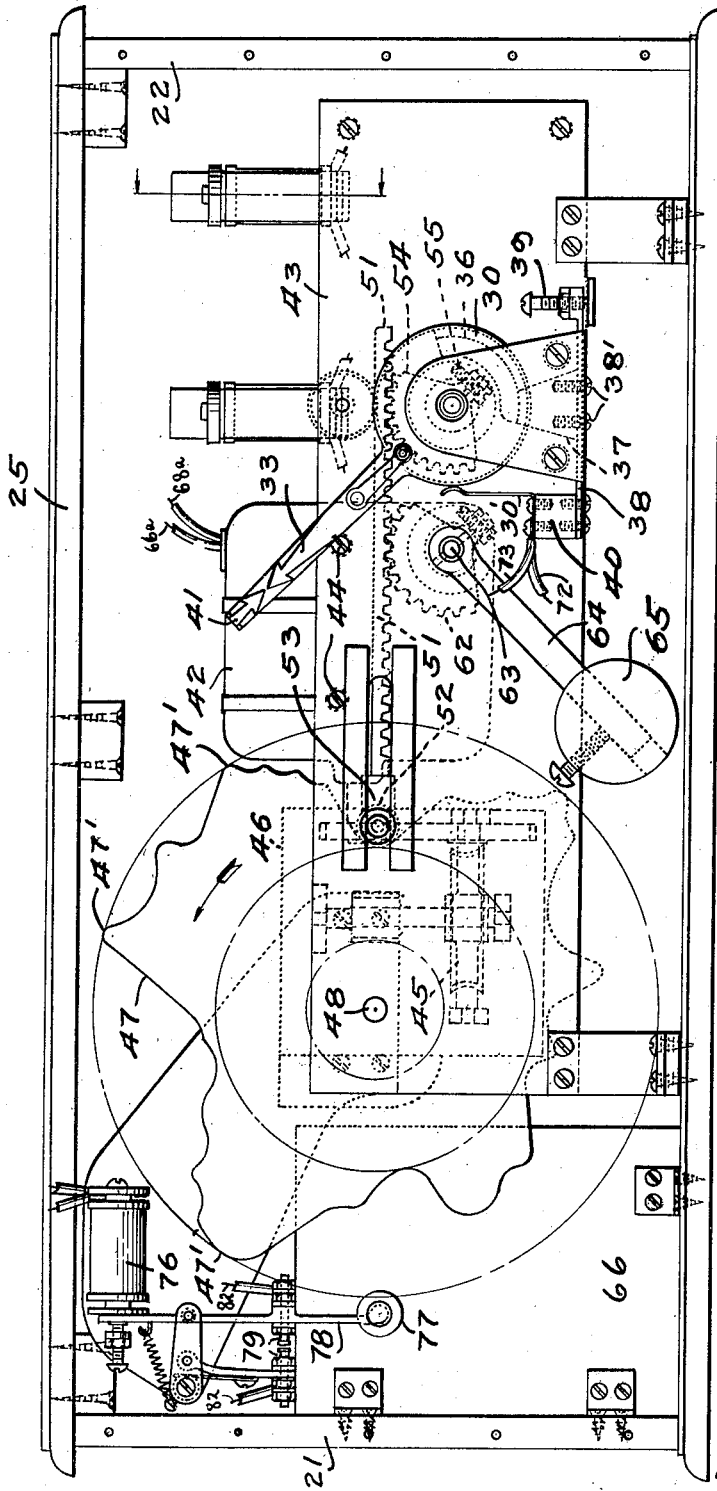

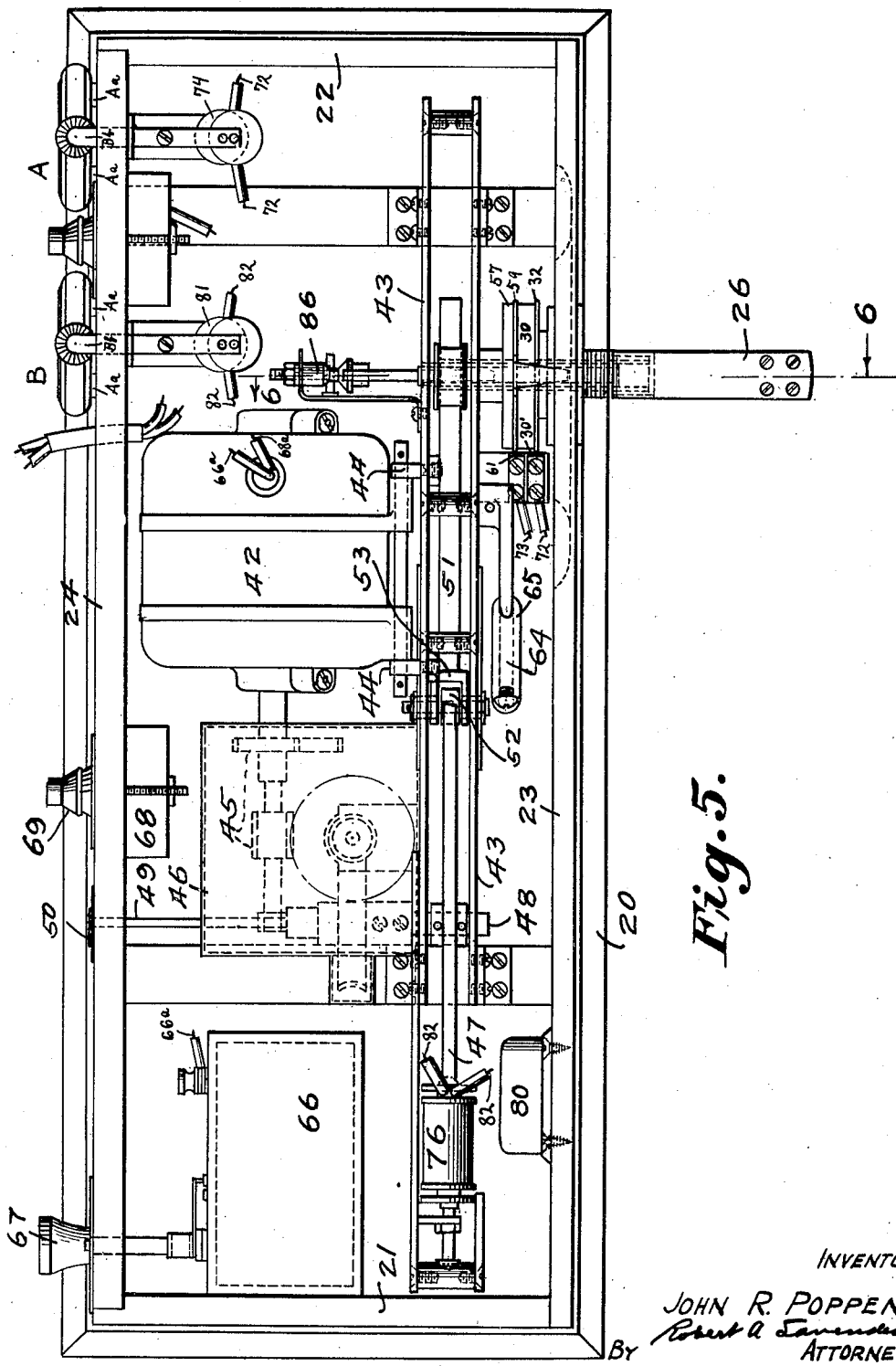

INVENTOR
JOHN R. POPPEN
BY Robert A. Lavender
ATTORNEY

Patented Dec. 10, 1935

2,023,488

UNITED STATES PATENT OFFICE 2,023,488

APPARATUS FOR DETERMINING THE RATE OF MUSCULAR AND MENTAL COORDINATION OF PERSONNEL

John R. Poppen, United States Navy

Application December 24, 1931, Serial No. 582,974

30 Claims. (Cl. 35—12)

(Granted under the act of March 3, 1883, as amended April 30, 1928; 370 O. G. 757)

My invention relates to an apparatus for observing and automatically registering the rate of mental and muscular coordination, alertness and proficiency of a person under test for determining his relative fitness for aviation and other duties.

When such duties require the making of altitude tests, submarine depth tests and numerous others, it becomes essential to determine the amount of fatigue a person may be subjected to without rendering its rate of mental and muscular coordination unsafely sluggish. By the use of my invention these tests may be carried out under conditions adapted to simulate the actual conditions encountered and incident to the efficient operation of expensive and/or dangerous apparatus without the necessity of actually operating the same.

The principal object of my invention is to provide a simple, inexpensive and portable machine for determining the fitness of personnel to perform special tasks requiring a minimum safe rate of mental and muscular coordination under physical strain, fatigue and other conditions attending such service.

Another object of my invention is to provide a simple, portable and comparatively inexpensive machine for determining and/or developing the proficiency of personnel in the rate of mental and muscular coordination. I preferably so arrange and construct my machine that an observer, or person conducting the test, will have complete knowledge of the progress of the test, while the person under test will not be aware of his recordings and consequently will not be influenced or disconcerted by any knowledge of its readings, thus securing a more accurate efficiency and fitness rating of the person under test.

A further object of my invention is to provide a machine for automatically performing the task of producing a definite, invariable, predetermined sequence of tests to determine the rate of mental and muscular coordination and thereby the fitness of personnel for certain important duties.

A further object of my invention is to provide a machine for measuring the mental and muscular coordination efficiency of personnel by automatically recording in legible form numerically the direct results of such coordination, independent of any personal interpretation or opinion of the person in charge of such machine.

A further object of my invention is to produce a means for determining and recording with speed and accuracy the differences in the rate of mental and muscular coordination of persons under normal as well as abnormal conditions, including distraction or confusion.

A further object of my invention is to provide a machine to ascertain with definiteness and certainty the fitness of persons in driving automobiles, and determine their alertness and rate of responsiveness in use of the steering wheel and in the application of the brakes and/or similar duties at a minimum safe rate of mental and muscular coordination under emergencies or other conditions.

A further object of my invention is to provide a means of speeding up the production in machine shops by the constant training and testing of personnel for lathe and other work.

A further object of my invention is to provide a simple follow-the-pointer mechanical movement as a personnel testing device, one of whose pointers or indicators being adapted to be manually moved in or out of synchronism with another arbitrarily driven pointer or indicator and which synchronism, or lack thereof, is adapted to be registered to ascertain as well as develop the rate of mental and muscular coordination of personnel under conditions tending to simulate some of the consequential conditions under which such coordination would be required, and thereby determine the present rate of such coordination as well as by practice therewith to develop the efficiency of personnel for duties requiring a high rate of coordination.

Other objects of my invention will be more fully described hereinafter or be rendered apparent from the following detailed description.

My invention consists substantially in an apparatus, and the construction, combination and arrangement of parts associated in the apparatus for the practice of my method as will be more fully set forth hereinafter, illustrated in the accompanying drawings and finally pointed out in the appended claims.

Reference is to be had to the accompanying drawings forming a part of this specification in which like reference characters indicate corresponding parts throughout the several views, and in which:

Fig. 1 is a diagrammatic view of my invention showing the electrical connections associated therewith;

Fig. 2 is a front view of the same, showing the operating elements for use by the person under test;

Fig. 3 is a rear elevation of the device showing the location of the recording instruments and control switches for use by the person conducting or supervising the test;

Fig. 4 is an enlarged view with the front of the cabinet and operating handle omitted to show parts of the interior mechanism more clearly;

Fig. 5 is a plan view with the top or cover omitted;

Fig. 9 is a detail vertical section showing a means for controlling the stop-watches used in recording the reactions of a person being tested;

Fig. 10 is an enlarged detail view of one of the several typical non-reset stop-watches and its mounting employed for recording, the one shown being used in determining the speed of the motor driven actuating cam which, in the instance shown, arbitrarily drives the pointer or indicator.

Referring more particularly to the drawings, 20 indicates the base of a relatively small cabinet in which is housed the mechanism and to which are attached the end sections 21 and 22, a front panel 23, a rear panel 24 and a cover 25.

Figure 6:
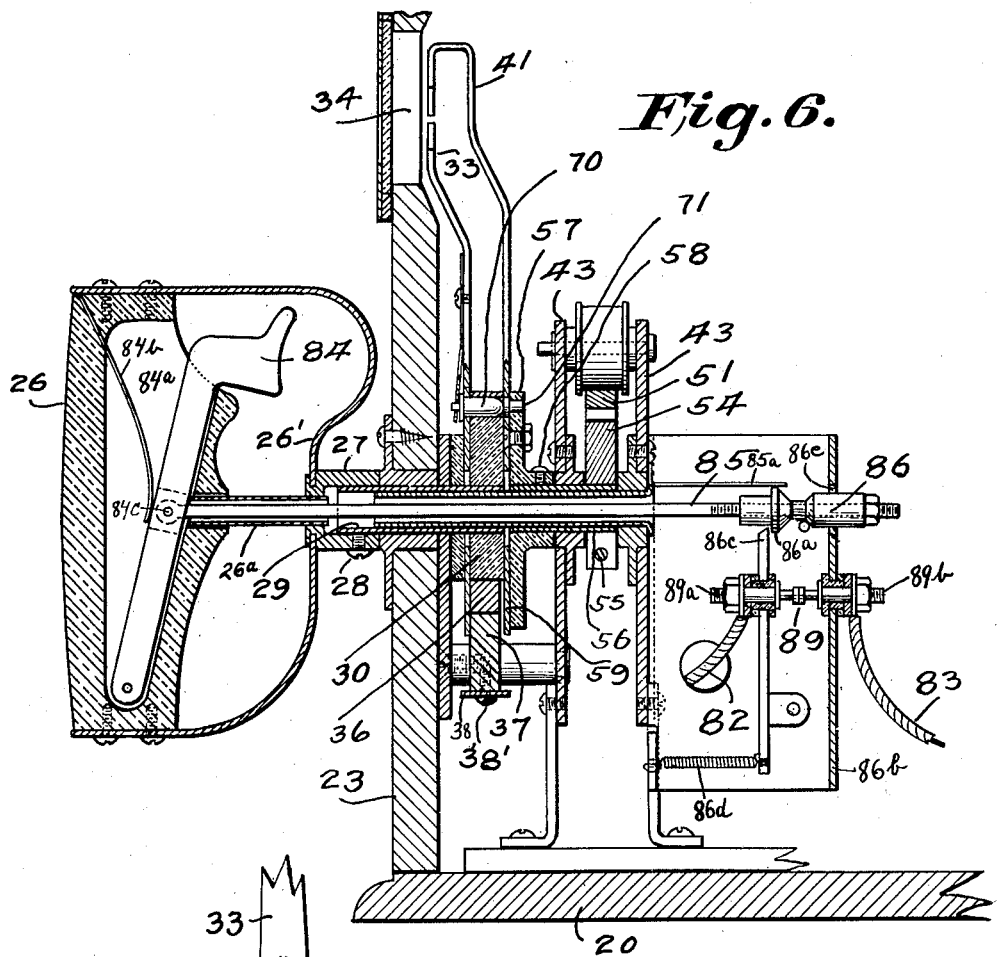
Fig. 6 is an enlarged vertical transverse section on line 6—6 of Fig. 5, showing the operating handle and associated parts in section.

Referring to Figs. 2, 4 and 6 it will be noted that an operating grip 26 is located in front of the panel 23 so as to be in convenient position for operation by a person under test when in a sitting position, assuming that the cabinet is located upon a table of convenient height.

Figure 7:
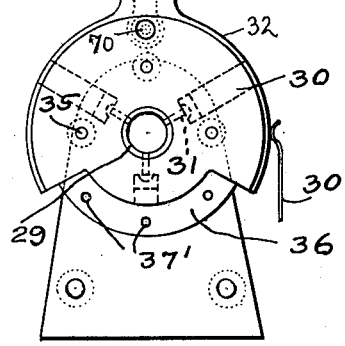
Fig. 7 is a detail view of a portion of the indicator pointer moved by the handle.

The grip 26 is provided with a guard 26' which terminates in a collar 27 secured by a set screw 28 to a tubular shaft 29. A hard rubber or fibre disk 30 is secured to the shaft 29 by means of countersunk rivets 31 (see Fig. 7) thus providing an insulation member for the support of central enlarged portion 32 of an indicator or pointer 33 which is movable back and forth and is visible through the arc of an opening 34 in the panel 23. Rivets 35 secure the portion 32 of the indicator or pointer 33 and the disk 30 together. The circular shape of the portion 32 provides an arcuate contact area for a spring or brush 30' forming a portion of the electrical circuit. With reference to Figs. 4, 6 and 7, it will be seen that resistance is applied to the rotation of the grip 26 through a friction block 36 mounted to bear against a bearing segment 37. The segment 37 is secured to the disk 30 by rivets 37', while the block 36, Figs. 4 and 6, is secured to a leaf spring 38 by screws 38', and having an adjustable set screw 39 located at one end and secured at the other end to the frame of the mechanism as at 40. Screw 39 is adapted to adjust the friction between block 36 and segment 37 and segment 37 alternately engaging the sides of the notch in portion 32 of indicator 33, in which notch said block 36 is mounted; is adapted to limit the movement of indicator 33.

A mechanically driven pointer 41, located to the rear of and in alignment with the pointer 33, is driven independently of the pointer 33 by a cam 47. The pointer 33 is to be manually driven back and forth by the person being tested, by means of the grip 26. The pointer 33 travels over an arc of approximately 90 degrees and at constantly varying directions and speeds adapted to maintain the same as near as may be in synchronism with the other pointer or indicator 41. The objective is to keep the manually operated pointer 33 synchronized to the best of the ability of the person under test with the mechanically operated pointer 41. The extent of attainment of the objective during a definite period enables the determination of the rate of mental and muscular coordination. Practice in the attainment of the objective tends to improve such rate.

An electric motor 42, mounted within the cabinet on the frame 43 as at 44, is connected, through a chain of reduction gears 45 arranged within a preferably oil-tight housing 46, to and drives an irregularly shaped cam 47 at a rate of speed of approximately one and one-quarter revolutions per minute, this being accomplished by approximately a 30 to 1 ratio of the worm and worm wheel gearing referred to as 45. The cam is pinned to the shaft 48, which shaft has a reduced extension 49 projecting through the housing 46 and through the rear panel 24 of the cabinet, and is provided with a revolution indicator 50. This indicator 50 is used by the attendant and will be referred to later.

The cam 47 is driven in the direction indicated by the arrow in Fig. 4 and imparts a reciprocating motion to a toothed rack 51 through contact with a roller 52 carried by the yoke 53.

Figure 8:
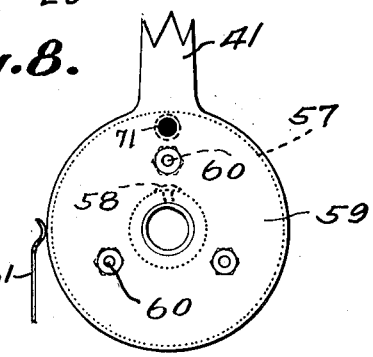
Fig. 8 is a similar view of the other pointer which is arbitrarily driven, being preferably automatically operated by an electric motor.

A toothed sector 54 meshing with rack 51 and clamped by a screw 55 to a sleeve bearing 56 transmits motion to the pointer or indicator 41 by means of the fibre or hard rubber disk 57 which is secured to the sleeve bearing 56 through set screw 58. The pointer or indicator 41 has an enlarged circuar base 59 which is secured to the disk 57 by the screws 60 (Fig. 8). Provision is made for transmitting current to the base 59 through a contact finger 61.

In order to hold the roller 52 snugly to the irregular faces of the cam 47 a second toothed segment 62 is mounted on a shaft 63 having bearings in the frame 43 and is provided with an adjustable arm 64 and an adjustable weight 65, or the roller 52 may be so held by any other convenient means.

The speed of the motor 42 may be controlled by a rheostat 66 located within the cabinet which is manually operated from the rear panel 24 by the control knob 67, switch 68 and control knob 69 (see Figs. 1, 3 and 5). Any variation of the speed of motor 42 and its driven cam 47 and indicator or pointer 41 tends to increase or decrease the difficulty of the person being tested to keep pointer or indicator 33 synchronous with 41.

As long as the person under test manipulates the manually operated hand grip 26 to cause the associated indicator or pointer 33 to be in substantial synchronism with the constantly varying travel of the mechanically operated indicator or pointer 41, the portion of the electrical circuit in wires 72 and 73 is adapted to be inactive, but just as soon as he becomes sluggish and his alertness decreases and he fails to maintain such synchronism, the spring pressed contact member 70, which is located in an aperture in the part 30, will thereby be moved off the insulated button 71 set in flush with the face of the base 59 of the pointer 41, and complete or close the electrical circuit through the wires 72 and 73, and brushes 30' and 61. This closed circuit will in turn cause the coil 74 of the electro-magnet 75 to release the stem of a non-reset stop watch "B". In this manner there will be registered the accumulated time during a test that the pointers or indicators 33 and 41 are out of synchronism. Knowing the total time of such test, the rate of muscular and mental coordination may be readily ascertained.

As an additional test of the rate of mental and physical reaction of persons while subjected to distracting external conditions, an electro-magnetic switch 76 is placed in circuit so that a roller 77, supported by a lever 78, will close a contact 79 when roller 77 is moved by the cam peaks 47' and will set off a buzzer 80 as an audible means to distract the subject.

The buzzer 80 is silenced by the subject while manipulating pointer or indicator 33 by operating, with the pressure of a finger of his hand grasping the grip 26, the trigger 84, movably mounted in a cavity 84a, and maintained in operative position by a spring 84b which may also be conveniently mounted within cavity 84a. Trigger 84 is preferably pivotally connected at 84c, Fig. 6, with one end of a rod 85 which passes through an opening in a wall of the grip 26 and between the fingers of the hand which may grasp the grip 26. To avoid frictional interference by the fingers with the free movement of rod 85, a tube 26a is provided surrounding rod 85 and extending between said opening in a wall of grip 26 and central opening in collar 27. Rod 85 extends loosely through the bore of tubular shaft 29 to a free space where it is connected to a trip member 86, in the instance shown in Fig. 6, having 86 threaded upon shaft 85, and which may be thereby adjusted relative to shaft 85, and locked thereto by lock-nut 86a. The trip member 85 is provided with a cylindrical portion slidably engaging the lower surface of an opening 86e in frame portion 86b to steady the end of rod 85. Trip member 86 is provided with a latching projection 86a, beveled upon one side and straight upon the other side, and normally adapted to lie adjacent said straight side is the straight side of a correspondingly beveled end of a movable latch member 86c mounted in a convenient portion of the frame and pulled by spring 86d. Electrical contact posts 89a and 89b are mounted on, and insulated from, latch member 86c and frame portion 86b and are adapted to normally contact at 89 to maintain the normal position of movable latch member 86c relative to that of its cooperating projection 86a of member 86.

When trigger 84 is operated, the straight edges of trip members 86, 86c engage and move member 86c to separate contact posts 89a and 89b, thus opening the circuit (adapted to flow through wires 82, 83) and silence buzzer 80 should it then be sounding.

The extent to which trigger 84 may be operated and the relative overlap of the adjacent surfaces of 86a, 86c are such that lever 86c trips past shoulder 86a each time trigger 84 is operated to a substantial extent, so that trigger 84 is thereby required to be separately operated each time the buzzer is sounded. The flat spring 85a is adapted to yield as the beveled adjacent surfaces of 86a, 86c ride over each other to reset these parts to their position shown in Fig. 6. A pin 86g is provided to limit the downward movement of the trip member 86 and its associated parts through pressure exerted by the spring 86a.

It will thus be apparent that in the preferred form of the apparatus embodiment of my invention, illustrated in Fig. 1, there are provided two electrical circuits, or parts of one general circuit, one of which is adapted to be closed at 79 at arbitrary intervals, such as by the high spots of cam 47 engaging roller 77, and adapted to be manually opened at 89, at the will of the person being tested, during the closed periods, by the operation of trigger switch 86 by trigger 84, Figs. 1 and 6, respectively to sound and silence buzzer 80; stop watch "A" being adapted to record the aggregate time during the test of a person that the buzzer 80 is sounding. The other circuit is adapted to cause stop watch "B" to register the aggregate time during the test of a person that the indicators or pointers 33 and 41 are out of synchronism; that is, when contact member 70, Fig. 6, movable with indicator 33 is off contact with insulating member 71 movable with indicator 41 and is contacting with the central portion of indicator 41, watch "B" not registering any time when 70 and 71 are in contact.

The total time of the test of a person is registered on the stop watch shown in Fig. 10 and the watch is started and stopped appropriately by the person conducting the test.

The total time of the distractions by buzzer 80 being known, the record on stop watch "A" of the unabated distractions affords accurate efficiency data thereof. The total time of the series of master movements of indicator 41 being known, and stop watch "B" recording the time that indicator 33 was non-synchronous therewith, the difference between such known and recorded times affords accurate efficiency data thereof.

The stop watches "A" and "B" are adapted to be removably supported each in a pair of brackets Aa secured to the casing side 24, Figs. 3, 5 and 9, by screws Ab, while the projecting end of the stop watch stem, which starts and stops the movement of the watch hands, is mounted each in a recess Ba in the adjacent face of its appropriate operating lever Bb, Fig. 9, whose opposite end is adapted to be operated appropriately by coil 74 or otherwise. This convenient mounting of the stop watches affords their ready removal and replacement for all desirable occasions simply by raising the lever free from the stem, inclining the top of the watch away from the casing and removing the watch from its brackets.

When tests are run to determine the qualifications and selection of personnel to perform special tasks such as effectively attaining and safely flying in carrying out high altitude tests or deep sea submarine work, the subject under test is also provided with well-known rebreathing mechanism such as an oxygen mask or helmet so as to determine his normal rate of muscular and mental coordination as well as such rate under such actual or simulated conditions as are usually encountered in the performance of such duties, and which conditions have a tendency to substantially slow up the normal rate of mental and muscular coordination. The tests of personnel under such simulated conditions by my apparatus affords the automatic making of a reliable record of the rate of mental and muscular coordination of the person under test directly from the acts and omissions of such person without the possibility of interference of the observer or others as well as without the same being influenced by the opinions or interpretations of the observer or person conducting the test; the observer merely records the results indicated by my machine, which are made automatically from the acts and omissions of the person under test, which records may be passed on to the superior required to select such personnel. By such machine personnel may be so tested by an observer skilled only in the use of my machine, whereas in the prior art the person conducting the test has been required to be a physician or other person so qualified as to arbitrarily determine the fitness of the subject tested based upon his personal opinion, and by whose personal opinion those charged with selecting qualified personnel were required to be guided.

The altitude or depth rate of mental and muscular coordination may be determined in any of the well known ways. As an example, the tube 90 in Fig. 1 is adapted to open over the mouth and nose of the person to be tested and to lead to the usual rebreather tank or bag. The person tested rebreathes the contents of the tube 90 and its connected bag or tank until his rate of mental and muscular coordination is reduced by oxygen deficiency to a predetermined unsafe rate whereupon that portion of the test is stopped and the oxygen content of the rebreather tube and bag or tank is determined to ascertain, for instance, the altitude beyond which the tested person cannot safely go.

By my invention the mental and muscular coordination rate of persons under given accompanying conditions may be determined with precision and the factors thereof accurately recorded in advance of their operation of a mechanism that would be dangerous to life and property especially when not being operated by those having a normally safe rate of coordination. My invention also enables such higher rates to be attained in advance of the actual operation of such dangerous mechanism.

While I have disclosed a mechanically driven mechanism for arbitrarily moving one of the pointers, it is to be noted that a manually operated means may be conveniently employed which may be operated by the person conducting the test.

It will be understood that the above description and accompanying drawings comprehend only the general and preferred embodiment of my invention and familiarity therewith will enable those skilled in the art to understand therefrom that many changes may be made in the form of the embodiment of my invention within its inventive concept and the scope of the appended claims without sacrificing any of the advantages of my invention.

The invention herein described may be manufactured and used by or for the Government of the United States for governmental purposes without the payment to me of any royalties thereon or therefor.

Having now so fully described my invention, what I claim is:

1. In an apparatus for determining and/or increasing the rate of mental and muscular coordination of personnel for performing special duties, the combination of means including an irregular cam for making a series of master movements, movable means which is to be manually moved by one of such personnel as nearly as possible in synchronism with said master movements of the said cam, and means for recording the extent that said personnel operated means is nonsynchronous with said master movements.

2. In an apparatus for determining and/or increasing the rate of mental and muscular coordination of personnel for performing special duties, the combination of means including a member having irregular circumferential surfaces for making a series of master movements, means for occasioning definite periodic distractions during said movements, movable means which is to be manually moved by one of such personnel as nearly as possible in synchronism with said master movements, means for recording the extent that said personnel operated means is non-synchronous with said master movements of said member, means manually operable by said personnel for abating said distractions, and means for separately recording the extent of the unabated distractions.

3. In a device for testing and/or developing the initial proficiency of personnel for performing special duties, the combination of two indicating means each adapted to be visible by the person operating one of them, rotary means having irregular cam surfaces for operating the first one of said indicating means, and manually operable means for operating the second one of said indicating means to keep said indicating means as nearly synchronous with said first indicating means as may be by a person whose proficiency therein may be developed thereby.

4. In a device for testing and/or developing the initial proficiency of personnel for performing special duties, the combination of two indicating means each adapted to be visible by the person operating one of them, means consisting of a series of cam surfaces for operating the first one of said indicating means, manually operable means for operating the second one of said indicating means to keep said indicating means as nearly synchronous with said first indicating means as may be by a person whose proficiency therein may be developed thereby, and means for recording the relative efficiency of said manual operation.

5. In a device for testing and/or developing the initial proficiency of personnel for performing special duties, the combination of two indicating means each adapted to be visible by the person operating one of them, cam surfaces for actuating the first one of said indicating means, manually operable means for operating the second one of said indicating means to keep said indicating means as nearly synchronous with said first indicating means as may be by a person whose proficiency therein may be developed thereby, and means for distracting the operator.

6. In a device for testing and/or developing the initial proficiency of personnel for performing special duties, the combination of two indicating means each adapted to be visible by the person operating one of them, rotary means having irregularly spaced cam surfaces for operating the first one of said indicating means, manually operable means for operating the second one of said indicating means to keep said indicating means as nearly synchronous with said first indicating means as may be by a person whose proficiency therein may be developed thereby, means for distracting the attention to the person under test during the operation of said indicating means, and means manually operable by said operator and adapted to abate said distraction.

7. In a device for testing and/or developing personnel for performing special duties, the combination of two indicating means each adapted to be visible by the person operating one of them, means consisting of a cam for operating the first one of said indicating means, manually operable means for operating the second one of said indicating means to keep said indicating means as nearly synchronous with said first indicating means as may be by a person whose proficiency therein may be developed thereby, means for recording the relative efficiency of said manual operations, means for distracting the attention of said operator, means manually operable by said operator and adapted to abate said distraction, and separate means for recording the relative efficiency of said abatement operations.

8. In a device for testing, and/or developing the speed of personnel in their mental and muscular coordination, in combination two indicating means, a frame adapted to movably mount the same, a casing for said frame and indicating means having an opening in one side thereof through which said indicating means are visible, means consisting of an irregular shaped cam member for operating the first one of said indicating means, and manually operable means extending through said casing side having said opening therethrough for operating the second one of said indicating means to keep said indicating means as nearly synchronous as may be by a person whose proficiency therein may be developed thereby.

9. In a device for testing, and/or developing the speed of personnel in their mental and muscular coordination, in combination two indicating means, a frame adapted to movably mount the same, a casing for said frame and indicating means having an opening in one side thereof through which said indicating means are visible, rotary means consisting of a multiplicity of cam surfaces for operating the first one of said indicating means, manually operable means extending through said casing side having said opening therethrough for operating the second one of said indicating means to keep said indicating means as nearly synchronous with said first indicating means as may be by a person whose proficiency therein may be tested or developed thereby, and means for recording the relative efficiency of said manual operation.

10. In a device for testing, and/or developing the speed of personnel in their mental and muscular coordination, in combination, two indicating means, a frame adapted to movably mount the same, a casing for said frame and indicating means having an opening in one side thereof through which said indicating means are visible, a cam member having many actuating surfaces for operating the first one of said indicating means, manually operable means extending through said casing side having said opening therethrough for operating the second one of said indicating means to keep said indicating means as nearly synchronous with said first indicating means as may be by a person whose proficiency therein may be developed thereby, and means for distracting the attention of the person under test.

11. In a device for testing, and/or developing the speed of personnel in their mental and muscular coordination, in combination, two indicating means, a frame adapted to movably support the same, a casing for said frame and indicating means having an opening in one side thereof through which said indicating means are visible, rotary means consisting of a multiple cam for operating the first one of said indicating means, manually operable means extending through said casing side having said opening therethrough for operating the second one of said indicating means to keep said indicating means as nearly synchronous with said first indicating means as may be by a person whose proficiency therein may be developed or tested thereby, means for distracting the attention of the person under test, and means extending through said casing side and manually operable by the person for abating said distraction.

12. In a device for testing, and/or developing the speed of personnel in their mental and muscular coordination, in combination, two indicating means, a frame adapted to movably mount the same, a casing for said frame and indicating means having an opening in one side thereof through which said indicating means are visible, means for operating the first one of said indicating means consisting of an irregular cam having many actuating surfaces, manually operable means extending through said casing side having said opening therethrough for operating the second one of said indicating means to keep said indicating means as nearly synchronous as may be by a person whose proficiency therein may be developed or tested thereby, means for recording the relative efficiency of said manual operation, means for distracting the attention of the person under test during said operation, and means extending through said casing side and manually operable by said operator for abating said distraction, said third and sixth stated means each having a manually contactable portion juxtaposed to each other and adapted to be separately operated by the same hand.

13. In a testing device, two movable indicators visible to the person under test, means for operating said indicators and varying the movements thereof, and recording means visible only to the person conducting the test whereby the movements of one of said indicators are registered relative to the movements of the other of said indicators.

14. In a testing device, two movable indicators visible to the person under test, means for operating said indicators and varying the movements thereof, cam actuating means for operating one of said indicators and varying the movements thereof, means for informing the person under test whether or not the movements of said indicators are out of synchronism, an audible signal, means for setting off said signal upon failure to keep said indicators synchronized, means for intermittently setting off said signal for distracting the attention of the person under test, means for stopping said intermittent means, by the person under test, recording means not visible to the person under test whereby movements between said indicators are registered, and recording means not visible to the person under test whereby the failure of response to stop said intermittent means is registered.

15. In a testing device, a movable indicator visible to the person under test, rotary means consisting of a cam-faced member for operating said indicator and varying the movements thereof, a second movable indicator visible to the person under test adapted to move in alignment with the movement of said first indicator, means for manually operating said second indicator, and recording means not visible to the person under test whereby movements of said second indicator relative to the movements of said first indicator are registered.

16. In a testing device, a movable indicator visible to a person under test, means for operating said indicator and varying the movements thereof, a motor driven cam connected by a rack and pinion mechanism for transmitting a reciprocating motion to said first indicator, a second movable indicator also visible to the person under test adapted to move in alignment with the movements of said first indicator, means including a grip for manually operating said second indicator and accessible to the person under test for maintaining synchronous movement between said indicators, and recording means not visible to the person under test whereby movements of said second indicator relative to the movements of said first indicator are registered.

17. In a testing device, a movable indicator visible to the person under test, rotary cam mechanism for operating said indicator and varying the movements thereof, a second movable indicator visible to the person under test adapted to be moved in alignment with the movements of said first indicator, a hand grip accessible to the person under test for operating said second indicator, means for creating an audible signal to inform the person under test of any failure to keep the movements of said second indicator synchronized with the movements of said first indicator, means located between said indicators for setting off said audible signal upon failure to keep said indicators synchronized, means for intermittently setting off said audible signal to distract the attention of the person under test, means for stopping said audible signal, a trip supported by said grip for operating said stopping means, and recording means not visible to the person under test whereby movements of said second indicator relative to the movements of said first indicator are registered, and recording means not visible to the person under test whereby failure to respond to silencing of said audible signal is registered.

18. In a testing device, a plurality of movable indicators visible to the person under test, cam actuating means for operating one of said indicators and varying the movements thereof, manual means for operating the others of said indicators and varying the movements thereof, and recording means whereby the relative movements of said indicators are registered.

19. In a testing device, two movable indicators visible to the person under test, means for operating said indicators and varying the movements thereof, cam actuated mechanism for operating and varying one of said indicators, means for informing the person under test of failure to keep movements between said indicators synchronized, means for stopping said informing means, and recording means whereby the relative movements between said indicators are registered.

20. In a testing device, two movably mounted visible indicators, means consisting of cam actuated mechanism for operating one of said indicators and varying the movements thereof, means adapted to operate the second of said indicators to follow the movements of said first indicator, and means whereby the relative movements between said indicators are registered.

21. In a testing device for developing the speed of mental and muscular coordination of personnel, the combination of means operable by a subject, a member connected to said means and movable therewith for breaking an electric circuit, a movable switch element operable by said member, a tapered portion on said member, an offset adjacent said tapered portion, a spring-held latch member extending to within operating range of said offset for breaking said electric circuit, a bracket for mounting said latch, electric contact members between said latch and said bracket.

22. In a testing device for determining the speed of mental and muscular coordination of personnel, in combination, a plurality of movably mounted indicators visible to the person under test, a cam, means actuated by said cam for operating one of said indicators and varying movements thereof, means including an operating grip accessible to the person under test for maintaining synchronous movement between said indicators, electrically operated audible signal means to sound upon failure to keep said indicators in synchronism, secondary means actuated by said cam for intermittently distracting the attention of the person under test by setting off of said audible signal means independently of the period of non-synchronism of said indicators, a stop watch "A" for totaling the aggregate time of failure to silence said audible signal means, another stop watch "B" for totaling the aggregate time of failure to keep said indicators in synchronism, electro-magnetic means for actuating said stop watches "A" and "B", and electro-magnetic trip mechanism accessible to the person under test for preventing the accumulation of time indicating failure of coordination to be registered upon said watches.

23. In a testing device, a movable indicator, means consisting of a cam for automatically and selectively imparting a series of irregular and intermittent periods of travel to said indicator, a second movable indicator means for manually operating said second indicator to follow the travel of the first of said indicators, and recording means for registering the extent of any failure to move said second indicator in synchronism with the travel of the first of said indicators.

24. In a testing device, a movable indicator, means consisting of a cam for mechanically imparting a series of gyrations to said indicator, a second movable indicator, means for manually operating said second indicator, and recording means for registering the extent said second indicator may be moved out of synchronism with the travel of the first of said indicators.

25. In a testing device, the combination of two movable visual indicators, means for automatically imparting a series of irregular periods of travel to one of said indicators, means for manually imparting reciprocating movement to the other of said indicators, and registering means for recording the extent of any failure to keep said manually operated indicator in synchronism with said automatically operated indicator.

26. In a testing device, two movable indicators, visible to the person under test, a cam mechanism for moving one of said indicators in a series of intermittent periods of travel, means including a hand grip for manually moving the other of said indicators to simulate the movement of the first of said indicators, an audible signal intermittently set in action by said cam mechanism, means comprising a plurality of electrical contact members located upon said indicators for sounding said audible signal on any failure to keep the movements of said indicator synchronized, a circuit breaker mechanism actuated by the hand grip, said circuit breaker adapted to silence said audible signal after being sounded by action of said cam mechanism, a stop watch for registration of accumulated time of failure to maintain synchronism of said indicators, electrically actuated means for starting and stopping the registration of time on said watch, a second stop watch for the registration of time of any failure to silence said audible signal and electrically actuated means for stopping said second stop watch, said second watch actuating means being also controlled by movement of the hand grip of said circuit breaker.

27. In a testing device for determining the reaction of a person when simulating the conditions of altitude, in combination, two movably mounted visual indicators, rotary cam mechanism for operating one of said indicators and varying the periods of travel, means including a hand grip for moving the other of said indicators, means for administering oxygen to a person who is operating said indicator by the hand grip, means for determining the effect of varying the supply of oxygen administered to enable the ascertainment to be made, in legible units of efficiency, of the altitude to which the person under test can ascend and recording means for disclosing the reactions of a person while undergoing a test.

28. In a testing device for determining the reactions of a person when simulating the conditions of altitude, in combination, a plurality of movable indicators, means for automatically moving one of said indicators in a cycle of varied periods of travel, means for manually moving the other of said indicators to follow the first of said indicators, means for administering oxygen to simulate the effect altitude has on a person who is operating the manual means moving one of said indicators while under test, means for indicating the effect of the oxygen administered, said means consisting of electrically actuated stop watch mechanism for recording any lack of response to mental and muscular coordination of the person under test.

29. In a testing device for determining the fitness of personnel in a mental and muscular coordination, in combination, a cam actuated movably mounted visible master indicator, a second movably mounted visible indicator, means for manually causing said second indicator to follow the movements of said master indicator, means for recording in units of time the time intervals of negligence on the part of the person under test to follow the movements of the master indicator, and oxygen apparatus including a rebreather mechanism for administering oxygen in varying quantities to simulate altitude conditions of a person who is operating said manual means, whereby said recording means indicates the reactions of a person at various altitudes.

30. In a testing device for determining the reaction of a person when simulating the condition of altitude, in combination, two movably mounted visible indicators, rotary cam actuated means for operating one of said indicators and varying the periods of movement thereof, means including a hand grip for manually imparting motion to the other of said indicators, registering means for recording the extent of any failure to synchronize the movements of said manually operated indicator with the movement of said cam actuated indicator, means for administering oxygen to the person under test, which test includes operating the indicator through said hand grip whereby said registering means indicates the effect of administering oxygen to the person under test and to enable the ascertainment to be made, in legible units of efficiency of the altitude to which the person undergoing test can ascend.

JOHN R. POPPEN.